United States Patent

[11] 3,628,448

| [72] | Inventor | Jort Boer |
| | | Oostzaan, Netherlands |
| [21] | Appl. No. | 865,359 |
| [22] | Filed | Oct. 10, 1969 |
| [45] | Patented | Dec. 21, 1971 |
| [73] | Assignee | Stork Amsterdam N.V. |
| | | Amsterdam, Netherlands |
| [32] | Priority | Oct. 10, 1968 |
| [33] | | Netherlands |
| [31] | | 6814480 |

[54] APPARATUS FOR TREATING ARTICLES
4 Claims, 5 Drawing Figs.

[52] U.S. Cl..................................................... 99/362, 198/131
[51] Int. Cl...................................................... A23l 3/04, B65g 47/34

[50] Field of Search........................................... 198/131, 22, 167; 118/239; 99/360-363; 107/57; 134/70-75, 126, 128

[56]  References Cited
UNITED STATES PATENTS

| 2,719,478 | 10/1955 | Van Der Winden.......... | 99/360 |
| 3,408,922 | 11/1968 | Mencacci et al.............. | 99/362 |

*Primary Examiner*—Leon G. Machlin
*Attorney*—Waters, Roditi, Schwartz & Nissen

ABSTRACT: An apparatus for the thermal treatment of commodities packed in containers, traveling in carriers which are rotatably supported in a conveyor. This conveyor passes through a treatment space and the containers are loaded into and discharged from said carriers. Each carrier comprises a number of compartments or cases with a C-shaped cross section, actuating members being provided for simultaneously loading or discharging more than one case from a carrier.

APPARATUS FOR TREATING ARTICLES

The invention relates to an apparatus for treating articles, carried by a conveyor through a treatment space, like a sterilizer or pasteurizer for foodstuffs packed in glass jars, plastics or tins, wherein the conveyor is provided with revolvable carriers, each consisting of a plurality of compartments or cases arranged in an annular configuration each case having an opening on at least one of the front sides for feeding and discharging the articles to be treated, while in the apparatus a station is provided for pushing the articles into the conveyor and discharging them therefrom, respectively by means of actuating members.

Such an installation is known e.g., from U.S. Pat. Nos. 3,165,055 and 3,151,540. The capacity of these installations is to a great extent connected with the size, especially the length of each carrier, that is to say with the number of articles which can be accommodated in each of the cases of the carriers. For practical reasons it is not possible to step up the capacity unlimitedly since otherwise the dimensions of the apparatus would increase beyond the permissible value. Another complication is in that the time required for charging and discharging the articles rises with the increase in length of the carriers.

It is an object of the invention to provide an apparatus in which the dimensions of the carriers remain within acceptable limits and wherein nevertheless an important increase of the capacity can be achieved without trouble being encountered on charging and discharging. This object is attained according to the invention in that the cases of each carrier have a C-shaped cross section and are arranged in a number of groups of cases mounted around a common axis of revolution, each group being capable of cooperation with the actuating members in such a way that the articles of an entire group can simultaneously be discharged therefrom or loaded therein.

Due to the C-shaped cross section there is an elongated opening throughout the length of the cases. Loading and discharging is effected by a direct cooperation between the actuating members and the articles via this opening. Due to the invention and contrary to the known apparatus two or more cases from one carrier may simultaneously be discharged which obviously creates the possibility to enhance the capacity considerably. A further advantage is that articles can be put into the one case which have a size different from the articles for the other case, since each case of a group has its own actuating members for loading and discharging.

The foregoing and other objects and advantages of the invention will appear in the description to follow. In the description reference is made to the accompanying drawings, which form a part hereof, and in which there is shown by way of illustration and not of limitation specific forms in which the invention may be embodied.

Figure 1:
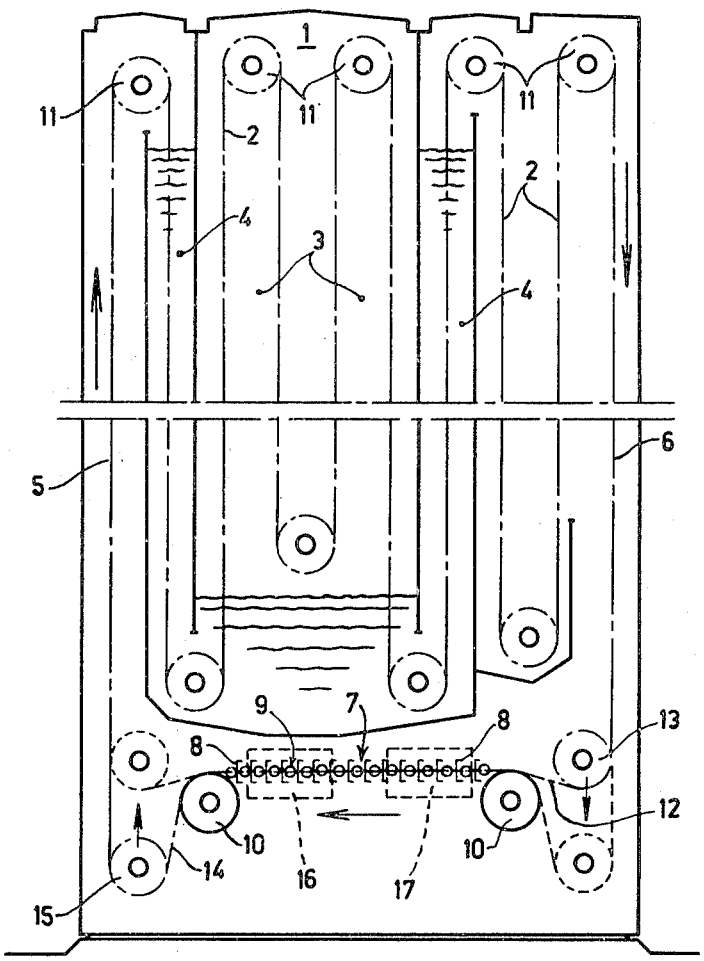
FIG. 1 shows a vertical front view of the apparatus.

The apparatus consists of a treatment space 1 through which advances a conveyor 2 along a track consisting of a number of loops 3. The space 1 is on either side bounded and closed by a water seal or lock 4 serving to maintain the pressure difference which in operation prevails usually between the treatment space 1 and the atmosphere. The conveyor 2 extends also in these water seals 4 and traverses further two vertical parts 5 and 6, situated outwards, for the supply of the articles to be treated in the space 1 and for the discharge of these articles from the said space. These two parts 5 and 6 are interconnected via a horizontal track portion 7 at the lower end of the apparatus.

The conveyor 2 is in a usual way composed of at least two parallel chains connected by cross partitions 8 (according to U.S. Pat. No. 2,806,423) and revolvable carriers 9. These carriers, the shape of which will be clarified with reference to FIGS. 2–5, consist each of a plurality of compartments or cases with a C-section which are arranged in an annular configuration. The carriers 9 are at their ends rotatably supported in the conveyor 2, that is to say in the aforementioned chains.

In the horizontal track part 7 there are means to rotate the carriers 9, e.g., with a gear wheel on the front side of the carrier, which cooperates with a rack, a separate chain or another driven gear wheel, as is usual in this type of apparatus.

The track part 7 is on either side bounded by a driving wheel and these wheels 10 are stepwise driven independent of the main drive of the conveyor 2, the latter drive being effected via one or more of the upper sprocket wheels 11. Assuming that the conveyor 2 advances in a direction, indicated by the arrow, a loop 12 is formed in the conveyor before the first wheel, this loop cooperating with a guide wheel 13 hanging in the conveyor. Beyond the second driving wheel there is likewise a loop 14 in the conveyor 2, this being provided with a guide wheel 15.

In the situation depicted in FIG. 1 the drive wheels 10 are about to stop the conveyor 2 in the track part 7. When this is effected, the loop 12 will gradually sag and the loop 14 will gradually rise until a situation is attained which in FIG. 1 is represented in dotted lines. At that moment the period of standstill in the track part 7 has ended and the driving wheels 10 are driven at a faster rate in such a way that at the beginning of the first next period of standstill the loop 12 is shortened and the loop 14 has sagged in a way as indicated by a dash-dot line in FIG. 1. Thereupon this cycle is repeated etc.

Figure 4:
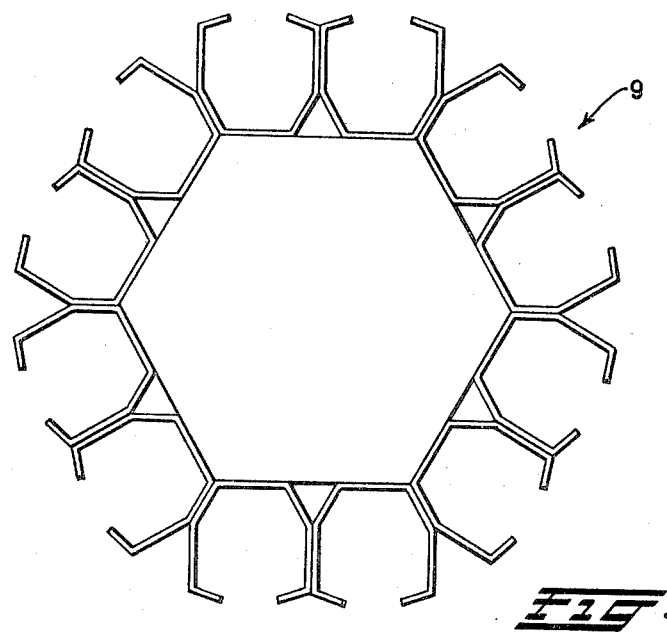

During the period of standstill actuating members 18 are active in the charging and discharging stations 16 and 17, respectively (see FIG. 2) for pushing the articles 19 into the cases 20 and discharging these articles therefrom, respectively. The cases 20 constitute in the carriers 9 groups which at least consist of two cases (FIG. 2–4) but which may also comprise three juxtaposed cases (see FIG. 5). These groups of cases are arranged in a geometrical configuration consisting of a square (FIGS. 2 and 5), a pentagon (FIG. 3) or a hexagon (FIG. 4). The actuating members 18 may cooperate in such a manner with each group of cases 20 that the articles 19 of an entire group of cases can be simultaneously loaded thereon, or discharged therefrom, respectively.

During the loading and discharging operation the carriers 9 are stationary, the carrier, after each completed loading or discharging operation being revolved through such an angle that a next group of cases comes to lie opposite the actuating members 18. This charging or discharging of the carriers 9 proceeds until the treatment is completed. This completion should be effected during a period of standstill of the conveyor 2 within the track part 7. This can be achieved by properly dimensioning and driving the wheels 10 and the loops 12 and 14.

In order to permit a revolution of the carriers 9 during the period of standstill of the conveyor 2 the actuating members 18 are movable with respect to the part of the conveyor which is standing still. These actuating members consist in the embodiment according to FIG. 2 of an endless belt or chain 21 which is running over two sprocket wheels 22, the latter being supported in a frame 23. The actuating members constructed in this way may be movable in a vertical direction since the frame 23 can be moved up and down between two positions. In the upper position a cooperation with the containers 19 in the cases 20 concerned is possible via an elongated opening 24 on the entire length of the cases, which results from the C-shaped cross section.

Figure 2:
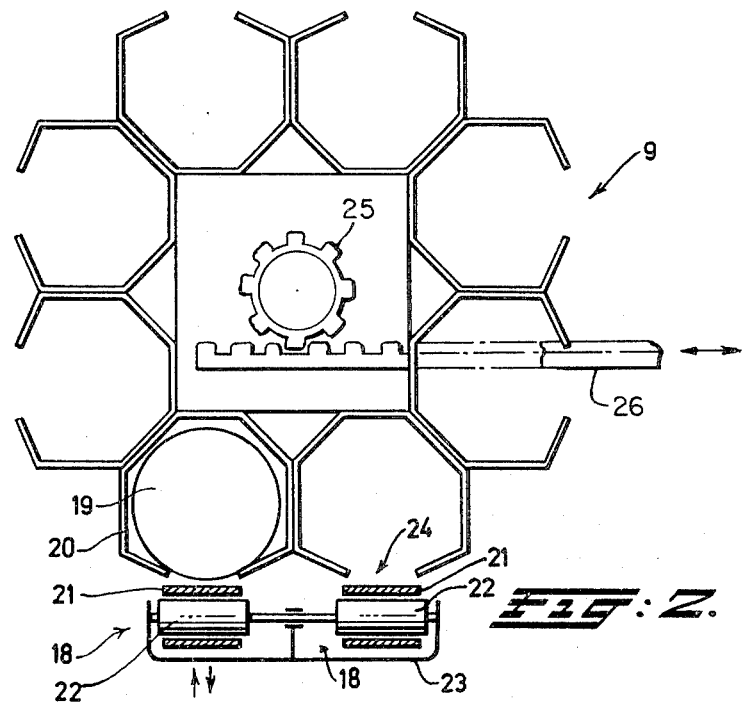
FIGS. 2–5 show to a larger scale four modified embodiments of the carriers of the apparatus according to FIG. 1.
Figure 3:
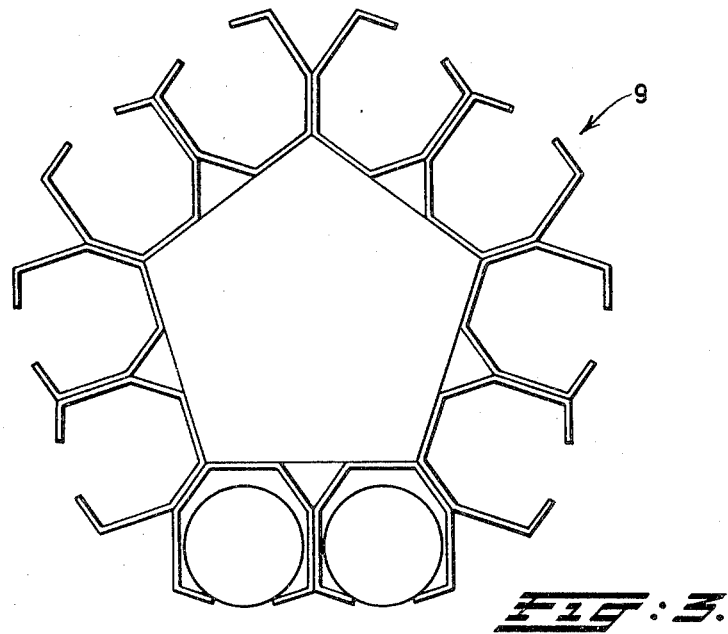
Figure 5:
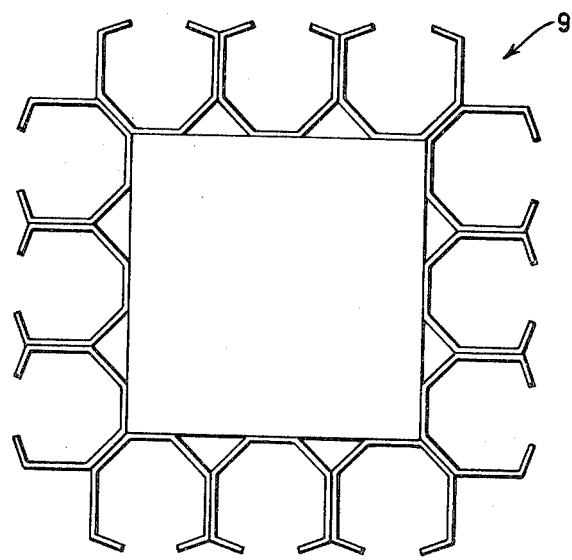

For the purpose of revolving the carriers 9 through the required angle in order to permit the cooperation of a next group of cases with the actuating members 18, (an angle which for the variants according to FIGS. 2 and 5 is 90° and which for the FIGS. 3 and 4 has a value of 72° and 60°, respectively) a gear wheel 25 may be secured to each carrier, said wheel cooperating with a periodically slidable rack 26, or each gear wheel may cooperate with a special chain (not represented) both being provided in the track part 7.

Within the scope of the invention is also an embodiment in which the carriers are subjected to a translation in the track part 7, because the conveyor 2 does not stop, whereas the revolution of the carriers 9 is temporarily interrupted in that part. In this embodiment the actuating members 18 always move along with the carriers 9 over a short part of the track 9. The members 18 move then back again to their starting position in the short lapse of time that the carriers 9 are revolving to their next loading or discharging position. The carriers 9 may rotate or not within the treatment space 1.

While preferred embodiments of the invention have been shown and described, it is to be understood that changes and variations may be made without departing from the spirit and scope of the invention as defined in the appended claims.

What I claim is:

1. An apparatus for treating articles by conveyance through a treatment space, like a sterilizer or pasteurizer for foodstuffs packed in glass jars, plastic or tins, comprising a conveyor for carrying said articles through said treatment space, said conveyor including a plurality of revolvable carriers, each said carrier having a plurality of adjacent cases arranged in an annular grouped configuration about the carrier, each case having an opening on at least one of its front ends for infeed and discharge of the articles to be treated, an article-loading zone in said apparatus, said zone including actuating members for loading the articles into said cases and discharging them therefrom, respectively, said cases each having a generally C-shaped cross section and arranged whereby said groups of cases of each carrier are mounted about a common axis of revolution, each said group being adapted to cooperate with said actuating members so that the articles aligned with an entire group of cases in said loading zone can simultaneously be discharged therefrom or loaded thereon.

2. An apparatus as claimed in claim 1, wherein said conveyor is adapted to be advanced continuously, including means in said loading zone for stepwise revolving of the carriers in said zone, the actuating members and the carriers during the interval between two successive stepwise revolving movements being relatively stationary respecting each other in the direction of movement of said articles.

3. An apparatus as claimed in claim 2, including means for forming an accumulation loop in said conveyor in said article loading and discharging zone, said means effecting periodically a considerable period of standstill of a segment of the conveyor in the region of the zone, and wherein said actuating members are movable relative to the stationary segment of the conveyor.

4. An apparatus as claimed in claim 3, wherein said members comprise endless belts cooperating with the portion of the articles which protrudes from the open portion of the C-shaped cross section of said cases, said endless belts being movable to and fro in a direction transverse to the plane in which the stationary segment of the conveyor is contained.

* * * * *